No. 712,387. Patented Oct. 28, 1902.
E. KEMPSHALL.
PLAYING BALL.
(Application filed May 14, 1902.)

(No Model.)

Witnesses:
F. G. Hachenberg.
F. E. Maynard.

Inventor:
Eleazer Kempshall.
By his Attorney,
F. H. Richards.

UNITED STATES PATENT OFFICE.

ELEAZER KEMPSHALL, OF BOSTON, MASSACHUSETTS.

PLAYING-BALL.

SPECIFICATION forming part of Letters Patent No. 712,387, dated October 28, 1902.

Application filed May 14, 1902. Serial No. 107,220. (No model.)

*To all whom it may concern:*

Be it known that I, ELEAZER KEMPSHALL, a citizen of the United States, residing at Boston, in the county of Suffolk and State of Massachusetts, have invented certain new and useful Improvements in Playing-Balls, of which the following is a specification.

This invention relates to playing-balls, and especially to those used in the game of golf; and its chief object is to increase the flying power of the ball while reducing the liability of rupture of the shell.

Figure 1:
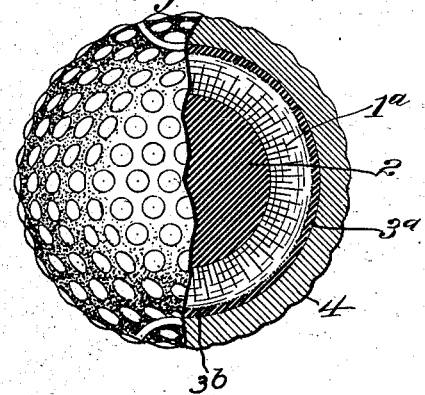
Figure 2:
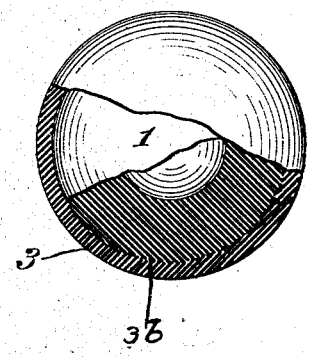

In the drawings forming part of this specification, Figure 1 is a part-sectional view of a ball made in accordance with my present improvements, and Fig. 2 shows a compound or double-rubber shell used in making the ball-core.

For the core I prefer to employ a sphere 1, Fig. 2, of firm but compressible rubber, which may be provided with a hard center piece 2, the rubber sphere being preferably expanded, as at $1^a$, upon said center piece, and the latter preferably consisting of plastic material, such as gutta-percha. It is not essential, however, in all cases that the rubber sphere have a center piece, as it may be either hollow or in the form of a solid ball of rubber. Upon the firm rubber sphere 1 I vulcanize a thin layer 3 of "pure rubber," which is quite soft as compared with the firm rubber sphere 1. Said layer 3 is likewise expanded by the core 2, as at $3^a$. Upon the core I apply a shell 4, of plastic material, preferably gutta-percha, and preferably holding the core under compression. Thus it will be seen that the core 1 of solid rubber is provided with a thin shell or film, which is in a tense condition. It will be further understood that when the outer shell 4 is depressed by a blow the soft-rubber film $3^a$ is forced to flow sidewise away from the area of depression, thus to a certain extent cushioning the blow and also calling into action a larger portion of the rubber core $1^a$ than would otherwise be the case, and, further, by its own elasticity tending to restore the ball instantly to its normal spherical shape, and hence rendering it livelier. It will also be seen that one of the advantages of my invention resides in having the firm supporting-sphere $1^a$ close to the supported shell 4, this being rendered practicable by having the cushioning layer $3^a$ very thin. It will be understood that the shock of the blow is taken largely by the firm rubber sphere $1^a$, which is sufficiently resisting to prevent undue indentation and bursting of the shell.

Changes in details may be resorted to within the scope of my improvements, and, if desired, other covers may be substituted for the shell 4.

Having described my invention, I claim—

1. A playing-ball comprising a sphere of firm, compressible rubber, a film or thin casing of materially softer rubber vulcanized thereon, and a hard cover formed of plastic material upon said casing.

2. A playing-ball comprising a sphere of firm, compressible, tensioned rubber, a thin casing of softer rubber vulcanized thereto and also tensioned thereon, and a hard cover formed of plastic material and holding said sphere and casing under compression.

3. A playing-ball comprising a rubber sphere, a thin, softer rubber casing vulcanized upon said sphere, and a cover of gutta-percha upon said casing and holding said core under compression.

4. A playing-ball comprising a firm rubber sphere in a state of expansion upon a harder center piece, a thin film or casing vulcanized thereon and consisting of rubber softer than said sphere, and a hard shell holding said sphere and casing under compression.

5. As a new article of manufacture, a ball or a core consisting essentially of a shell of solid rubber which is firm but compressible, combined with a relatively thin outer casing of softer rubber vulcanized thereon; said rubber shell being also filled with a relatively hard center piece.

ELEAZER KEMPSHALL.

Witnesses:
B. C. STICKNEY,
RALPH JULIAN SACHERS.